June 24, 1930.   L. T. JOHNSON   1,767,213
SCALE MECHANISM
Filed Aug. 4, 1926
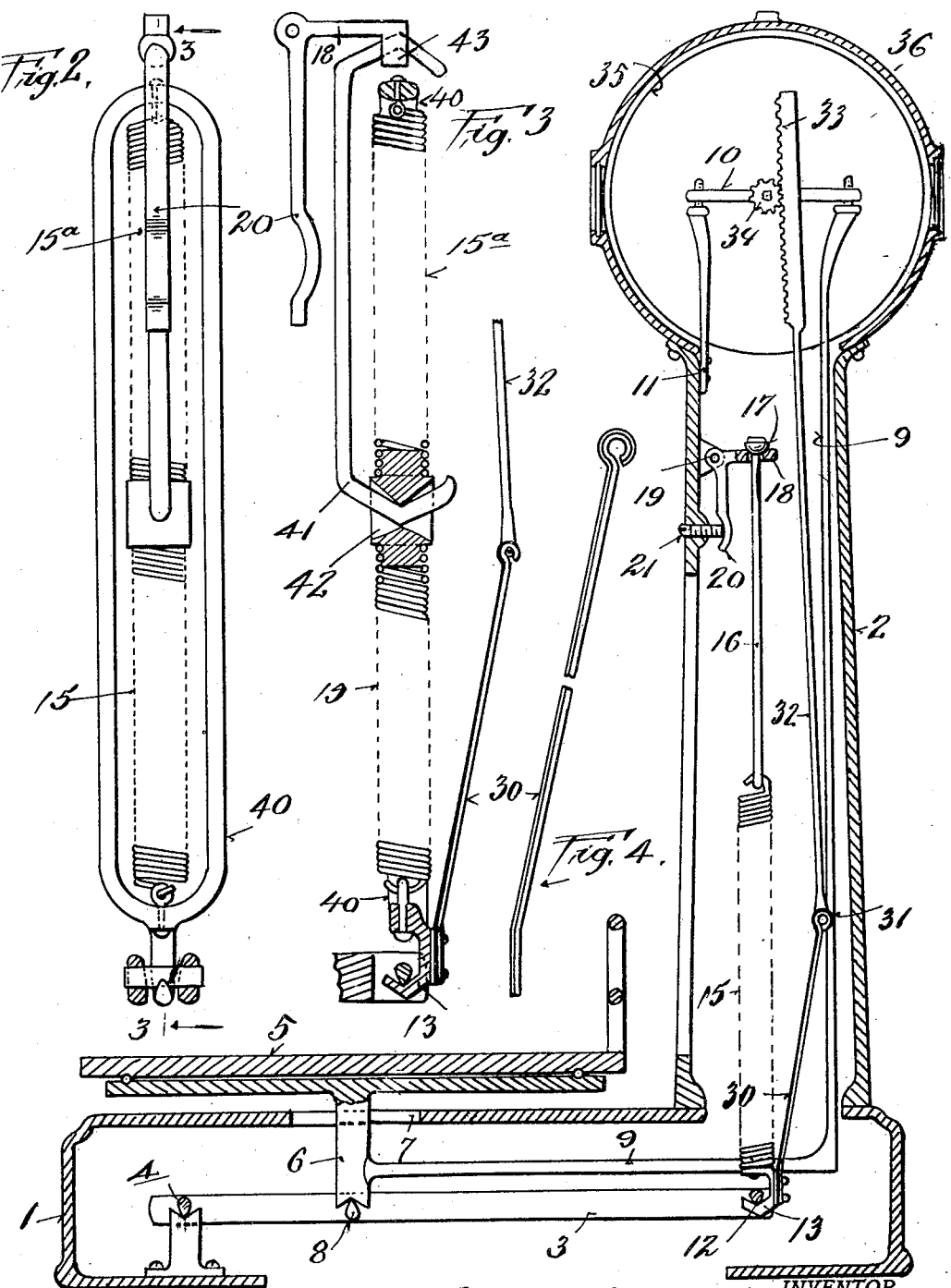

Patented June 24, 1930

1,767,213

UNITED STATES PATENT OFFICE

LEONARD T. JOHNSON, OF NEWARK, NEW JERSEY

SCALE MECHANISM

Application filed August 4, 1926. Serial No. 127,069.

This invention relates to scale mechanism, and has for its object the provision of a scale which is simple in structure, economical of manufacture, and efficient and accurate in operation.

A further object of the invention is to provide thermostatic compensation means of extreme simplicity for maintaining accurate reading throughout changes of atmospheric and weather conditions.

A further object of the invention is to provide a thermostat for a two-spring scale structure with means of mounting the same in the scale assembly.

A further object of the invention will appear more fully hereinafter. The invention consists substantially in the combination, construction, location, and relative arrangement of parts, all as will be more fully hereinafter set forth, as shown in the accompanying drawing, and finally pointed out in the appended claims.

Referring to the drawings,

Fig. 1 is a view in side elevation and vertical cross section illustrating a scale embodying my invention.

Fig. 2 is a view in front elevation of a slightly modified form of scale, i. e., a double spring type.

Fig. 3 is a sectional view taken on the line 3—3 of Fig. 2 and looking in the direction of the arrows, showing the application of the thermostat of my invention to this type of spring structure.

Fig. 4 is a detailed view of the thermostat employed in accordance with my invention.

The same part is designated by the same reference character wherever it occurs throughout the several views.

In weighing mechanism such as scales of the cylinder type, it is customary to employ a thermostat to compensate for variations in temperature conditions, and many arrangements have been proposed for effecting compensation by a thermostatic means. For example, in my prior Patent No. 1,483,888, granted February 19, 1924, I have shown one simple arrangement for effecting compensation of adjustment due to variation in temperature conditions. It is among the special purposes of my present invention to provide a thermostat device for effecting compensation for temperature variation, which has for its chief merit, its extreme simplicity, minimum of parts, and ease of zero adjustment. In fact, in accordance with my present invention, the only part used for thermostatic adjustment is the thermostat itself, thus permitting the elimination of all links, levers, and connecting rods ordinarily and heretofore employed.

Referring to Fig. 1 of the drawing, in which one embodiment of my invention illustrated refers, character 1 designates the base of a standard type of scale having the usual hollow post 2 resting thereon. Weighing lever 3 is located within the base, and is fulcrumed, as at 4, near the front end thereof. The platter 5 is provided with a portion 6, which extends through an orifice 7 in the top of the base 1, and is pivotally supported as at 8, by the lever 3. The portion 6 is provided with the usual check rod 9, which extends horizontally in the base 1 and upwardly in the post 2, as shown, and by means of a link connection 10 is secured to the front of the post 2 as at 11. The rear end of the lever 3 is provided with a pivot 12, around which is hooked the supporting end or hook 13 of the spring 15, the other end of which is connected to one end of a rod 16, preferably supported by means of a ball and socket support 17 by one arm 18 of the bell crank lever pivotally carried at 19 by the front of the post 2. The other arm 20 of the bell crank lever 18 bears against one end of a set screw 21, access to which is afforded through the front of the post 2, so that the tension of the spring 15 may be varied within the limits of movement of the set screw 21 for zero adjustment of the scale. It will be readily appreciated that this constitutes an exceedingly simple means of securing zero adjustment of the scale under all conditions.

The hook 13, in accordance with my invention, has secured thereto one end of the thermostat device 30, the other end of which is pivotally connected, as at 31, to one end of the actuating rod 32, carrying at the end thereof the usual rack teeth 33, which mesh with the gear wheel 34 which controls the graduated scale cylinder 35, which rotates within the casing 36, supported at the top of the post 2. It will be seen from the foregoing that in colder weather the spring 15 shortens and stiffens, which tends to raise the rack rod 32, but the thermostat device 30 moves out from its fixed position with respect to the hook 13, throwing the rack rod further from the fulcrum, and drawing the rack rod down to maintain the scale member at its zero position. It will be seen from the foregoing, therefore, that I have provided an exceedingly simple, while at the same time efficient scale and thermostat where the thermostat itself constitutes the only part employed for effecting proper adjustment. It will likewise be seen that I have provided an exceedingly simple and easy zero adjustment.

In Figs. 2 and 3 I have shown my invention as applied to the double spring type of scale, that is where two springs 15 and 15ª are applied. Heretofore it has been impossible to effectively apply thermostatic adjustment to the two or double spring type of scale structure. In accordance with my invention, I am able to do so. To enable me to connect the thermostat device 30 to the hook 13 of the spring 15, I provide a loop 40, completely surrounding both springs, and to which the outermost ends of the springs 15 and 15ª are anchored. The spring assembled is supported by means of a pivoted hook 41, which extends into a collar 42 at the point of juncture of the two springs, the other end of which is pivotally carried by a saddle 43 at one end of the lever 18 of the bell crank lever, the other end of which, 20, is employed for zero adjustment as previously described. It will be seen from this construction that any movement imparted to the springs by reason of a change of the position of the thermostat is imparted to both springs.

It is understood that two springs are employed ordinarily, to promote stability, and in normal operation, when one spring is placed under a stretching tension, the other spring contracts. This makes it possible to use the heavier springs, which give longer life, and for this reason the two-spring type of scale is preferable to the single spring type of scale.

In accordance with my invention, it will be seen that when adjusting for zero reading, the whole loop is adjusted without changing the tension of the springs. Therefore easier adjustment is permitted, and more accurate adjustment obtained, because the adjustment is correct throughout the scale, whereas in the double spring type of scales heretofore employed, where adjustment is made by changing the position of the springs at the center of the spring assembly which has heretofore been necessitated, while such adjustment may be accurate at the weight adjustment (or zero), due to the distortion of the alignment of the springs, the same is inaccurate at other graduations of the scale.

Many modifications and changes of details will readily occur to those skilled in the art, without departing from the spirit and scope of my invention as defined in the claims, but having now set forth the objects and nature of my invention, and having shown and described structures embodying the principles thereof, what I claim as new and useful and of my own invention, and desire to secure by Letters Patent, is:—

1. In a compensating scale, the combination of a weight actuated means, a spring for resisting movement of the weight actuated means, a graduated member and connections between said means and graduated member including a thermostatic device joining one end of said spring with said connections.

2. In a compensating scale, the combination of a weight actuated means, a spring for resisting movement of the weight actuated means, a rotatable graduated member and connections between said means and graduated member including a thermostatic device joining one end of said spring with said connections.

3. In a compensating scale, the combination of a weight actuated means, a rotatable drum having graduations thereon, a rack and gear connection between said means and drum including a thermostat device and a spring for resisting movement of said means said thermostat device uniting said spring with said connection.

4. In a compensating scale, the combination of a casing, a weight actuated device, a rotatable drum, a spring structure for resisting movement of said device and connections between said device and drum including a thermostat uniting said spring and connections for operating the drum to maintain it in zero position at air temperature.

5. In a compensating scale, the combination of a casing, a weight actuated device, a rotatable drum, a spring structure for resisting movement of said device and rack and gear connections between said device and drum including a thermostat uniting said spring and connections for operating the drum to maintain it in zero position at air temperature.

6. In a compensating scale, the combination with a casing, a weight actuated device, a rotatable drum, a spring structure for resisting movement of said device, and connections between said device and drum, of a thermostat uniting said spring and connections for operating the drum to maintain it in zero position at air temperature, and means for adjusting the position of the drum to a zero reading exteriorly of the casing.

7. In a compensating scale, the combination with a weight actuated mechanism including a pivoted lever, a graduated member, a spring for resisting the movement of said mechanism attached to one end of said lever and connections between said lever and graduated member of a thermostatic device in said connections, said thermostatic device being connected to said lever.

8. In a compensating scale, the combination with a weight actuated mechanism, a drum having scale graduations thereon, a spring for resisting movement of said mechanism and connections between said mechanism and drum of a zero adjusting means connected to the center of said spring.

9. In a compensating scale, the combination with a weight actuated mechanism, a drum having scale graduations thereon, a spring for resisting movement of said mechanism and connections between said mechanism and drum of a zero adjusting means connected to the center of said spring, and a thermostatic device in said connections.

10. In a compensating scale, the combination with a weight actuated mechanism, a drum having scale graduations thereon, a spring for resisting movement of said mechanism, a loop supporting both ends of said spring and attached to said mechanism, and connections between said drum and mechanism of an adjusting means attached to the center of said spring.

11. In a compensating scale, the combination with a weight actuated mechanism, a drum having scale graduations thereon, a spring for resisting movement of said mechanism, a loop supporting both ends of said spring and attached to said mechanism, and connections between said drum and mechanism of an adjusting means attached to the center of said spring, and a thermostatic device in said connections.

12. In a compensating scale, the combination of a weight actuated lever, a graduated drum, means for rotating said drum, a thermostat comprising the sole connection between said means and one end of said lever, and means for adjusting the position of the end of said lever with respect to a portion of said means.

In testimony whereof I have hereunto set my hand on this 22nd day of July A. D., 1926.

LEONARD T. JOHNSON.